United States Patent [19]

Cole

[11] Patent Number: 4,867,096
[45] Date of Patent: Sep. 19, 1989

[54] TUBULAR SHEAR WAVE SOURCE

[75] Inventor: Jack H. Cole, Ponca City, Okla.

[73] Assignee: Conoco Inc., Ponca City, Okla.

[21] Appl. No.: 941,231

[22] Filed: Dec. 12, 1986

[51] Int. Cl.[4] .............................................. G01V 1/04
[52] U.S. Cl. .................................... 181/114; 367/189; 181/121; 181/401
[58] Field of Search .............. 181/102, 105, 106, 108, 181/109, 110, 113, 114, 121, 401, 139, 140, 141, 142; 367/140, 142, 143, 189, 190, 911, 912; 166/65.1, 66, 104, 113, 118, 153, 177, 179, 206, 249

[56] References Cited

U.S. PATENT DOCUMENTS

| | | | |
|---|---|---|---|
| 3,245,223 | 4/1966 | Degen | 175/56 |
| 3,280,935 | 10/1966 | Brown | 367/189 |
| 3,504,756 | 4/1970 | Bodine | 181/108 |
| 3,514,749 | 5/1970 | Padberg, Jr. | 367/77 X |
| 3,578,081 | 5/1971 | Bodine | 166/249 |
| 3,718,205 | 2/1973 | Fair et al. | 181/106 X |
| 3,752,256 | 8/1973 | Mollere | 181/117 |
| 3,999,626 | 12/1976 | Adams | 181/121 X |
| 4,135,598 | 1/1979 | Stafford | 181/114 |
| 4,310,066 | 1/1982 | Won | 181/121 |
| 4,327,814 | 5/1982 | Erich, Jr. | 181/121 |
| 4,516,227 | 5/1985 | Wener et al. | 181/110 |
| 4,548,281 | 10/1985 | Bodine | 175/55 |
| 4,631,964 | 12/1986 | Sprunt et al. | 367/13 |
| 4,639,905 | 1/1987 | Goodloe | 181/201 |
| 4,709,362 | 11/1987 | Cole | 367/189 |
| 4,730,692 | 3/1988 | Fair et al. | 181/114 |
| 4,735,280 | 4/1988 | Cole | 181/113 |

FOREIGN PATENT DOCUMENTS

| | | | |
|---|---|---|---|
| 616602 | 7/1978 | U.S.S.R. | 181/113 |
| 672588 | 7/1979 | U.S.S.R. | 181/121 |

Primary Examiner—Brian S. Steinberger
Attorney, Agent, or Firm—Charles E. Quarton

[57] ABSTRACT

A device for generating elliptically polarized shear waves for introduction into a soft earth medium including marshy and water-covered earth surfaces. The device consists of a shear wave generator coupled to a coupling tube having a conical lower end that is maintained in energy-coupling relationship within the earth medium. Shear waves such as elliptically generated shear waves are introduced into the tube member for travel along the tube and further earth coupling about the bottom cone member as it is progressively driven into the earth medium. Suitable hold-down weight is utilized to maintain most effective coupling pressure on the cone member, and, support equipment, either land or marine vehicle, may include crane and alignment structure for continually maintaining the tubular vibrator member in proper vertical attitude during operation.

11 Claims, 4 Drawing Sheets

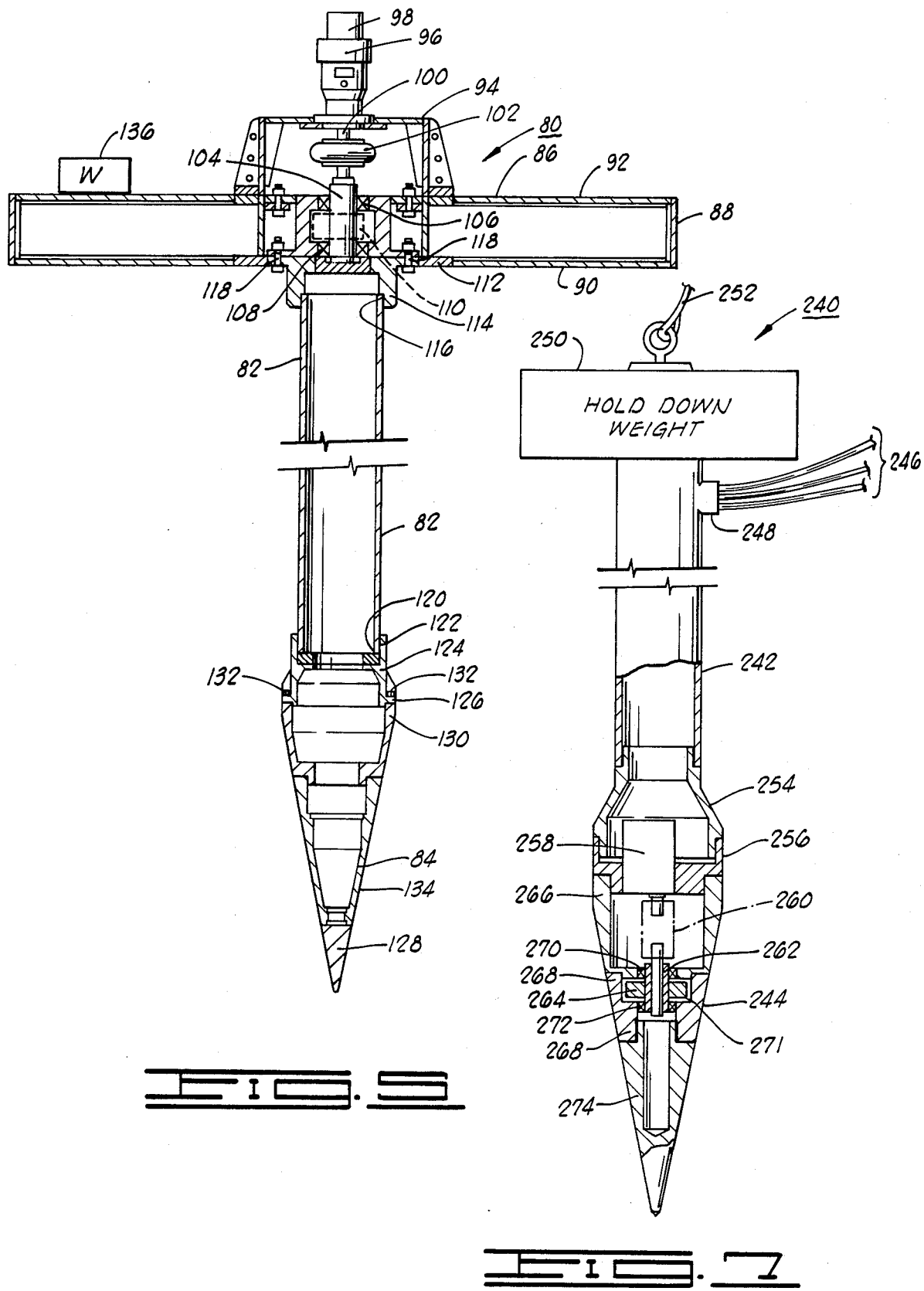

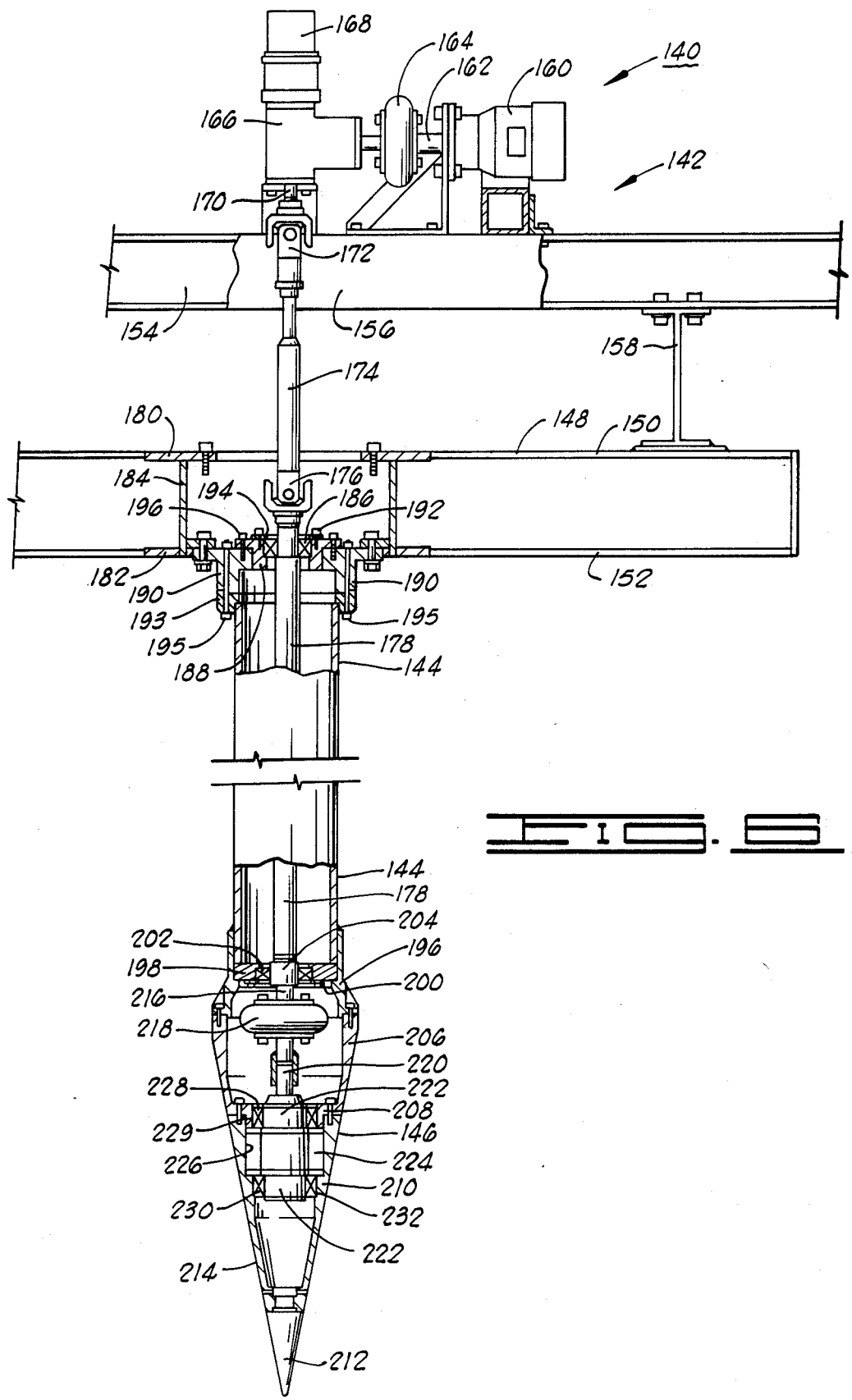

TUBULAR SHEAR WAVE SOURCE

BACKGROUND OF THE INVENTION

1. Field of the Invention

The invention relates generally to seismic energy vibrators and, more particularly, but not by way of limitation, it relates to shear/compressional wave sources employing a traveling wave tube for coupling acoustic energy into the earth at soft, wet or marshy terrain.

2. Description of the Prior Art

Prior teachings are best characterized by the U.S. Pat. No. 3,365,019 in the name of Bays and entitled "Seismic Vibrator for Marshland and Submarine Use". This early vibrator teaching was directed to compressional wave energy generation and it used a cupshaped coupling or foot member to engage a vibratory source into marshland surfaces. Conical outer surfaces of the foot member served to maintain continual energy-coupling engagement through a vibratory sequence as the vibrator sank progressively into the earth. It was necessary to move the vibrator to more firm footing periodically. This teaching, of course, was directed solely to compressional wave generation and to Applicant's knowledge there has been no similar effort directed to generation of shear waves. Existing shear wave generator teachings, both vibratory and impulsive, can only couple to hard surfaces and produce linearly polarized shear waves. Thus, the only existing alternative is the use of mode-converted shear wave data when such soft terrain areas are encountered.

SUMMARY OF THE INVENTION

The present invention relates to improvements in shear wave generation techniques as utilized in soft surface areas. The invention couples shear wave and compressional wave energy into a soft earth surface by utilizing a rigid tube that is set to vibration at one end while the opposite end is embedded within the earth in energy-coupling relationship. More particularly, orbital vibration is effected directly on the tube so that the earth-coupled lower end induces elliptically polarized shear wave energy within the earth medium. Specific vibrator tube structure may be utilized variously from waterborne vessels, land mobile structure or the like, depending upon the surface type of the area of survey. Basically, the tube vibrator consists of an orbital vibratory source rigidly secured to the upper end of a tube, and a hardened steel conical tip member affixed to the lower end of the tube and adapted for vertical insertion into the earth medium.

Therefore, it is an object of the present invention to provide a shear wave source for use over marshes, marine environments, and soft surface earth areas.

It is also an object of the present invention to provide a shear wave source that is easily transported and utilized from many of various land or water vehicles.

It is still further an object of the invention to provide an orbital vibrator source for coupling both shear and compressional wave energy into a soft earth surface.

Finally, it is an object of the present invention to provide an extremely versatile seismic source for conducting such as vertical seismic profiles and general seismic exploration over soft or water covered areas.

Other objects and advantages of the invention will be evident from the following detailed description when read in conjunction with the accompanying drawings which illustrate the invention.

BRIEF DESCRIPTION OF THE DRAWINGS

FIG. 5 is a view in vertical section of a tube vibrator constructed in accordance with the present invention;

FIG. 6 is a view in vertical section illustrating an alternative form of tube vibrator;

FIG. 7 is a view in vertical section and partial block form of another alternative form of the invention;

DETAILED DESCRIPTION OF THE INVENTION

Figure 1:
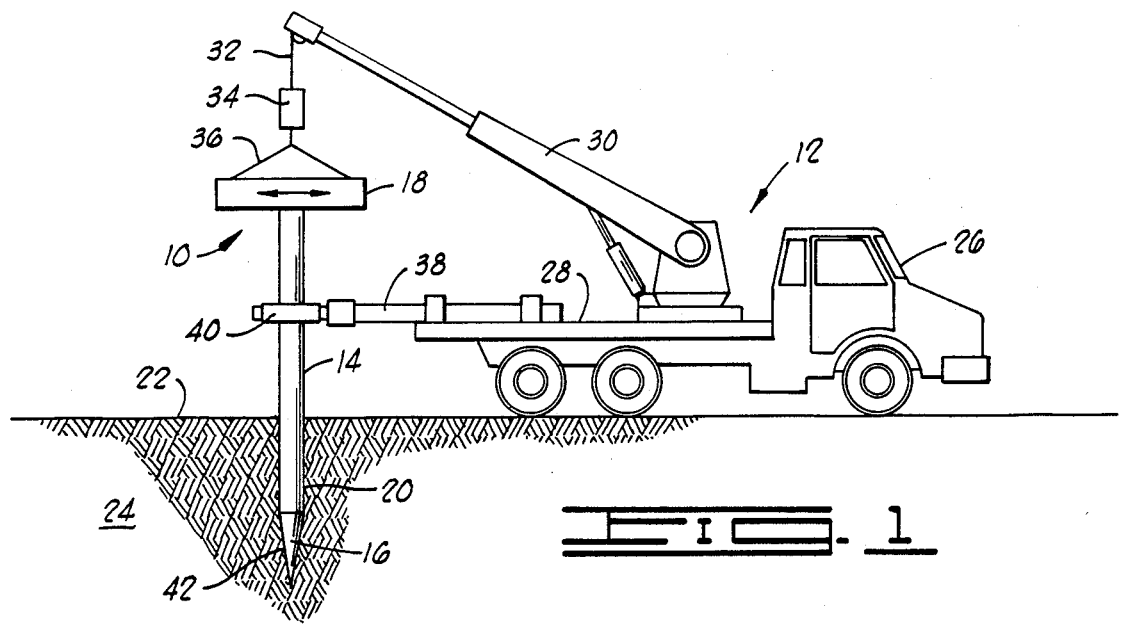
FIG. 1 is an idealized side view in elevation of a truck carrier in combination with a tube vibrator.

FIG. 1 illustrates a tube vibrator 10 functioning in coaction with a support vehicle 12 the tube vibrator 10 consists of a tube 14 having a lower end tip 16 as the upper end is secured to a lateral vibrator 18. The tube 14 and tip 16 are operated within a pre-formed hole 20 within surface 22 of earth medium 24.

The tube vibrator 10 is maintained in correct vertical positioning by means of support vehicle 12 consisiting of a suitable carrier vehicle 26. The bed 28 may be outfitted to include a telescoping crane 30 which supports tube vibrator 10 by means of a cable 32, vibration isolator 34 and cable bail 36. The vibration isolator 34 may be any of various types of flexible connector suitable to insulate vibration between vibrator 80 and supporting cable 32. The carrier vehicle bed 28 also includes a positionable frame 38, with vibration absorbing roller yoke 40, for guiding the tube 14 and maintaining vertical alignment with earth hole 20.

While any of several types of lateral vibrator assembly may be utilized as vibrator 18, it is preferred that an orbital vibrator be utilized in order to provide optimum engagement of usable energy into earth medium 24. Thus, a selected form of orbital vibratory source, as will be further described below, may be utilized to impart a lateral vibration to the top of tube 14 whereupon the conical lower face 42 will couple elliptically polarized shear waves into the earth.

Thus, it is now apparent that when the upper end of the thin-wall steel tube 14 is caused to vibrate laterally, the vibratory motion is effectively transmitted over what may be considerable distances through the tube, and, in fact, is difficult to suppress. In like manner, the concept is utilized with input of lateral vibratory energy to tube 14 with propagation downward along tube 14 for coupling into shear-resistant earth material that lies beneath the softer earth surface material.

Figure 2:
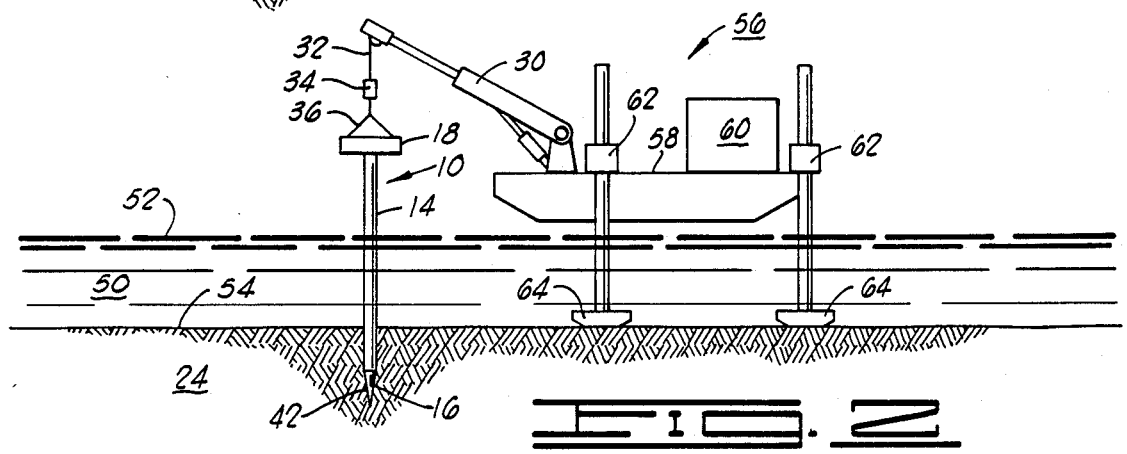
FIG. 2 is an idealized side view in elevation of a waterborne craft in combination with a tube vibrator.

FIG. 2 shows a similar type of vibrator tube 10 as it might be utilized over a water body 50 having a surface 52 and water bottom 54. In this case, vibrator tube 10 functions in coaction with a shallow draft lift boat 56 of a type which may be jacked-up off of the water surface thereby to achieve stable position. Thus, the lift boat 56 consists of a main hull 58 with power source 60 and a plurality of spaced power jacks 62. The power jacks 62 are capable of simultaneous operation to lift vessel 58 upward for support by pads 64 on water bottom 54. In this manner, an immovable platform is achieved and the crane 30 can then be operated to control properly aligned suspension of vibrator tube 10 with cone tip 16 inserted through the water bottom 54 into more firm earth medium therebelow. It should be apparent that the crane 30 and associated vibrator tube control structure may be supported from any of drill barges, ships, marine platforms, bottom crawlers, marsh vehicles, submersibles and the like.

Figures 3, 4:
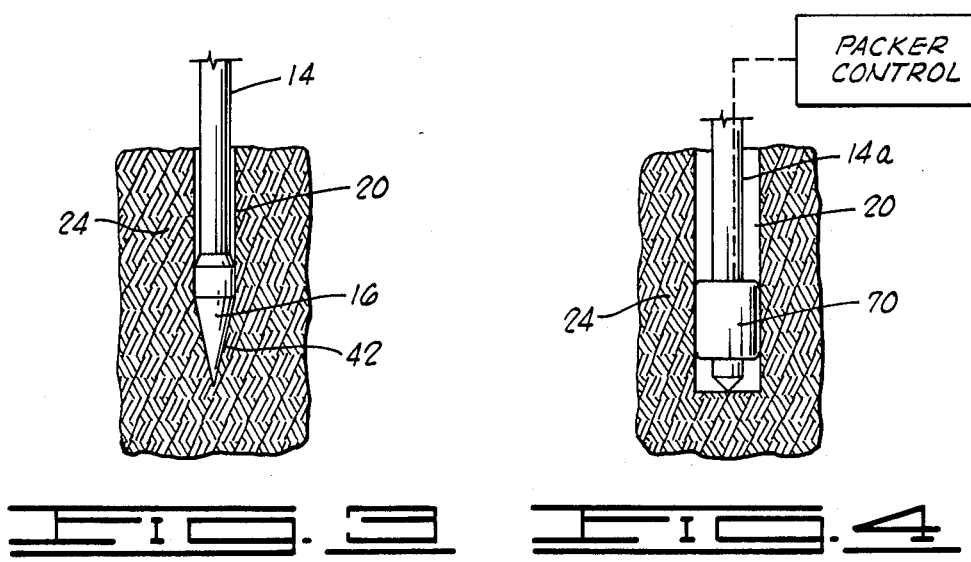
FIG. 3 illustrates one form of tube energy-coupling attitude within an earth medium.
FIG. 4 illustrates an alternative form of tube energy-coupling within an earth medium.

FIGS. 3 and 4 illustrate two alternative forms of energy coupling that may be utilized with the vibrator tubes. In FIG. 3, the tube 14 is forced under weight downward into earth medium 24 to engage firmly the conical face 42 of cone tip 16 for energy coupling and propagation. In the case of a soft earth application such as that of FIG. 1, a pre-formed hole 20 may be drilled to allow insertion of tube 14. Alternatively, in the water bottom case, the tube 14 and cone tip 16 may simply be forced through the bottom surface.

FIG. 4 shows an alternative coupling structure wherein a tube 14a is inserted within a pre-formed drill hole 20 in earth medium 24 and energy coupling is carried out through a packer assembly 70. Thus, the packer 70 may be such as a liquid-filled, inflatable bladder that is controlled from the support vehicle to maintain firm engagement with the sides of pre-drilled hole 20. This type of engagement might possibly have an advantage in that either linearly, elliptically, or circularly polarized waves can be generated and coupled therethrough. In contrast, the tapered cone tip 16 of FIG. 3 is designed to maintain contact with hole side walls while sinking progressively into the earth as the hole displaces downward, and it will function best with an elliptical polarized vibratory input, this also including circularly polarized shear energy as a special case.

Operation of the vibrator tube 10 relies upon the combined weights of the vibratory source 18 and the tube 10 to provide adequate hold-down weight. If additional hold-down force is needed, it may easily be added by such as adding lead weight in a manner that will be described below. It may appear that shear wave energy traveling down the tube 14 could be dissipated by water surrounding the tube; however, since vibration amplitude is relatively small, the lateral tube velocity at seismic frequencies is quite low and fluid drag forces are negligible. If vibration reflections up and down the tube 14 should become a problem, it can be handled by providing a suitable damper or isolator coupling at the tube top which presents the correct impedance thereby to allow absorption of upward reflected energy.

FIG. 5 illustrates a basic form of tube vibrator 80 similar to that previously discussed and consisting of a tube 82, cone tip 84 and vibrator 86. Vibrator 86 may be an orbital source similar to those disclosed in co-pending patent applications as identified hereinafter. For example, vibrator 86 may be an eccentric-weight type of source formed to include a housing member formed as a flat cylinder having a cylindrical side wall 88, lower plate 90 and upper plate 92. A motor housing 94 connected over the center of base plate 92 supports such as a hydraulic motor 96 that functions under control of a servo-valve 98 and associated hydraulic control structure (not shown). The hydraulic motor 96 provides drive rotation via a shaft 100 through a PARAFLEX coupling 102 to a drive shaft 104 that is rotatably mounted within an upper bearing 106 and a lower bearing 108. An eccentric mass rotor 110 (dashlines) secured on drive shaft 104 then rotates to provide orbital motion as transmitted through a flange member 112 to tube 82.

A flange collar 114 is secured as by welding about the upper rim 116 of a thin-walled steel tube 82 of selected length. The flanged collar 114 is then secured to flange member 112 by means of fasteners 118. The steel tube 82 is selected to be of a length and diameter consistent with the particular application. In present design, an 8 inch diameter tube is utilized that has a length of approximately 9 feet, thus, making the overall length of tube and cone tip about 12 feet. These dimensions are subject to wide variation.

The lower rim 120 is secured as by welding within a bore 122 of a collar 124 formed with a downward facing flange 126 for receiving the cone tip 84. Cone tip 84 is formed of high-strength steel with a hardened point 128 and an upper annulus 130 formed for mating engagement with flange 126 as secured by a plurality of fasteners 132.

In operation, the tube vibrator 80 is positioned and steadied by attending structure, cable support and the like with the cone tip 84 engaged within an earth medium. That is, tube 82 and cone tip 84 is forced downward within the earth medium to seek sufficiently shear-resistant earth material to afford energy coupling and propagation. The cone surface 134 must continually maintain secure coupling, and sufficient hold-down force must be applied on tube vibrator 80. Thus, a plurality of weights such as lead bricks 136 may be stacked on upper plate 92 as required. In actual practice up to 2500 lbs. has been added, but there is virtually no limit. The hydraulic motor 96, as controlled in conventional manner from suitable VIBROSEIS® control equipment, then operates at selected frequency and duration to drive eccentric rotor 104 thereby to generate orbital vibration as transmitted through flange 112 to the steel tube 82. This vibration, in turn, travels down tube 82 and is firmly coupled into the cone tip 84 to couple the energy into the surrounding earth medium as elliptically polarized shear waves.

As previously mentioned, such a seismic source generates a seismic wave that may be detected at three-dimensional geophone arrays to define an east-west shear component, a north-south shear component, and a compressional wave component. In practice, it has been found that each of these orthogonally displaced components is detected with significant strength and signal-over-noise character so that it brings about new and different processing techniques for formulating such as vertical seismic profiles and other seismic section displays. For example, it is contemplated that a series of vibratory sequences be run with alternate sequences run in opposite rotation of the source eccentric. In this manner, some interesting detection effects can be achieved in subsequent processing. For example, certain stacking and summation procedures enable cancellation of shear waves and augmentation of compressional to enhance further their interpretability.

Referring now to FIG. 6, a tube vibrator 140 is illustrated that employs a vibrator system wherein the orbital motion is developed in a plane transverse through the cone tip. Tube vibrator 140 consists of a superstructure 142, tube 144 and cone tip 146. Superstructure 142 consists of a base member 148 consisting of upper and lower plates 150, 152 and a cylindrical side wall similar to that of side wall 89 (FIG. 5). A yoke formed of a pair of spaced, parallel channel members 154, 156 is secured by opposite I-brackets 158 to opposite sides of base member 148. A hydraulic motor 160 is secured in horizontal disposition on top of channel members 154, 156 to provide rotary output on a shaft 162 through a flexible PARAFLEX ® coupling to a right angle gear drive assembly 166. A shaft encoder 168 is connected in synchronism with the right angle gear train output on a shaft 170.

Vertical rotation drive on shaft 170 is coupled through a universal joint 172 led between channel support members 154, 156 via a main drive shaft 174 axially downward through a universal joint 176 to a main drive shaft 178. The hub of base member 148 is formed of upper and lower flange plates 180 and 182 as welded to a circular hub plate 184, and the main drive shaft 174, 178 is led axially downward therethrough.

Main drive shaft 178 is led through a bearing 186 supported by a bearing block 188 secured concentrically within a flange collar 190. Fasteners 192 secure a bearing retainer plate 194 over bearing block 188, and fasteners 196 secure block 188 to the flanged collar 190. A further collar 193 receives tube 144 in welded insertion therein, and a series of fasteners 195 secure the lower collar to the flanged collar 190. As the tube 144 is positioned to extend concentrically downward over main drive shaft 178.

The lower end of tube 144 is secured in welded insertion within a collar assembly 196 as it is assembled to retain a circular bearing block 198 and retainer plate 200. Thus, a bearing 202 is axially retained in support of a shaft coupling 204 that is connected to main drive shaft 178. The cone tip 146 is then further formed by a cowl portion 206 suitably secured to the lower rim of collar 196 and including an inwardly flanged rim 208. Cone tip 146 is further comprised of a lower conical member 210 that terminates in a hardened tip 212. Overall, the cowl portion 206 and conical portion 210 form a continuous conical surface 214, the energy-coupling surface.

Shaft coupler 204 is connected to splined shaft 216 through a flexible PARAFLEX ® coupler 218 to provide rotary output on a shaft 220 formed integral with a hub 222 that carries an eccentric weight 224 keyed thereon. The eccentric weight 224 rotates within a cylindrical chamber 226 formed within lower cone portion 210 just beneath cowl portion flange 208, as the upper part of hub 222 is retained within the inward flange 208 and the lower part of hub 222 is retained within a bearing 230 seated in a counterbore 232 formed in cone portion 210.

In operation, the tube vibrator 140 is handled from a support vehicle or craft as support lines or cables may be connected by a suitable yoke arrangement to support channels 154, 156. If desired, additional weight may be added to the vibrator structure as lead bricks or the like may be disposed on upper plate 150 of base member 148. Any of various arrangements can be made to increase the weight bearing upon the cone tip assembly. A tube vibrator 140 of present design is an 8 inch diameter tube and tube/cone assembly approximately 12 feet in length, that exerts approximately 1500 pounds and this weight has been augmented in testing to 2500 pounds. The requirements as to vibrator hold-down weight will vary with the conditions and properties of the earth medium.

The hydraulic motor 160 can be controlled in conventional VIBROSEIS ® manner in any of various combinations of frequency, duration and sweep length as rotation is generated to drive the main drive shaft 178 through coupler 218 to the eccentric weight 224. This provides direct orbital weight motion in a plane transverse to the vertical axis of cone tip 146 and about midway along the outer cone surface 214. Orbital vibration is then coupled into the surrounding earth medium to impart elliptically polarized shear waves for propagation in the surrounding earth medium.

Test results along the vertical bore hole, with orthogonal detectors located every 100 feet therealong down to 1200 feet, indicated production of very strong and concise shear and compressional waves. Raw data detected in each of the three-dimensional detectors at each level verifies the existence of strong seismic motion in each of the east-west detector, the north-south detector and the vertical detector (compressional wave). It is particularly eventful to note that a very strong compressional wave was detected at each vertical geophone downward almost directly beneath the vibratory source point of engagement. The existence of the strong vertical compressional wave is verified by analysis of a unit shear stress element located directly beneath the base plate in accordance with criteria of Mohr's circle for that element. More particular disclosure of this form of shear wave propagation is discussed in Applicant's U.S. patent application Ser. No. 897,448 entitled "Method of Seismic Exploration Using Elliptically Polarized Shear Waves". Particular forms of orbital vibrator and related energy sources are more fully discussed in the above application, as well as in U.S. application Ser. No. 897,434 entitled "Apparatus for Generating Elliptically Polarized Shear Wave".

FIG. 7 shows a tube vibrator 240 as it may be constructed in relatively simple, tubular form. Thus, the vibrator consists essentially of a tube 242 and cone tip 244 with hydraulic and/or electrical synchronization and drive cables 246 introduced directly into the tube 242 through a feed-through 248. A suitable hold-down weight 250 is secured on top and connected with control and tethering means 252. All drive components may be housed in the cone tip 244 as a cowl portion 254 and collar 256 coact to support a hydraulic motor 258 in vertical alignment. Rotational force from motor 258 is applied through a suitable coupler 260 to a spline-connected hub 262 carrying an eccentric weight 264 secured thereon. Formation of cone components 266 and 268 makes provision for an internal cylindrical chamber 271 wherein eccentric weight 264 rotates, as well as for positioning of upper bearing 270 and lower bearing 272 in support of rotor hub 262. The lower cone component 274 may be formed essentially as the like component of FIG. 6.

Figure 8:
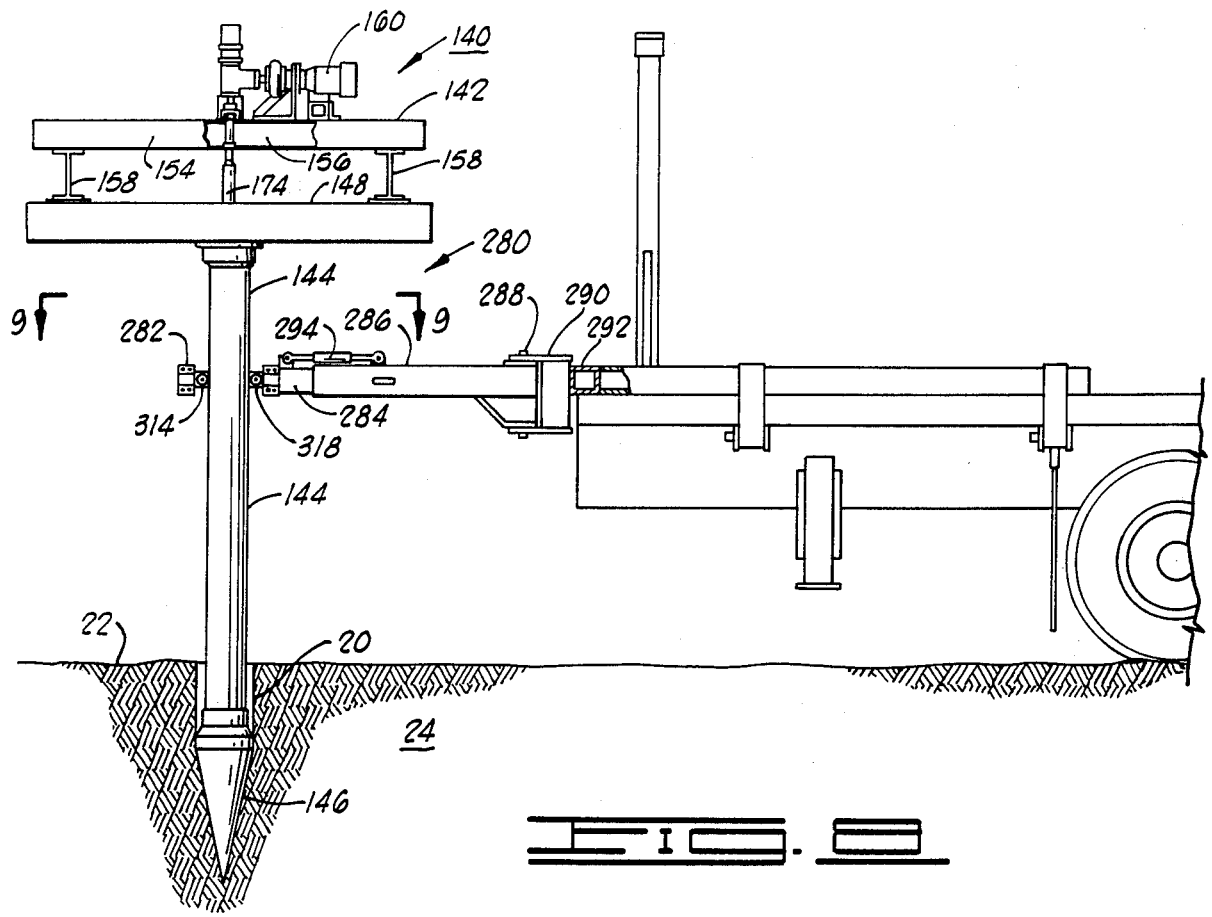
FIG. 8 is a side view in elevation of a carrier vehicle bed with tube vibrator and alignment structure.
Figure 9:
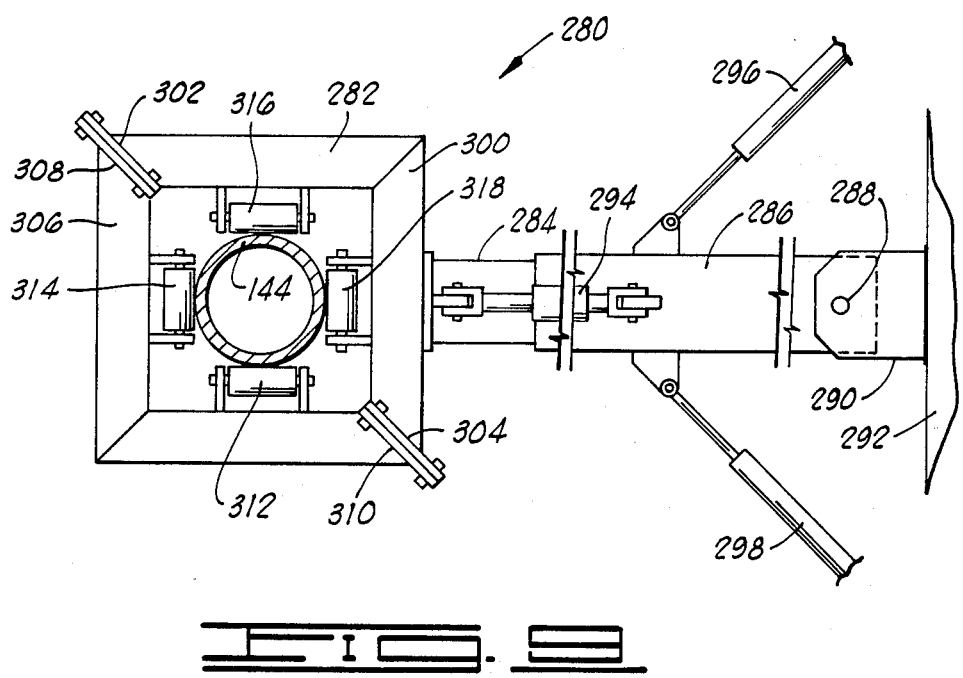
FIG. 9 is a top plan view of the alignment structure of FIG. 8.

FIGS. 8 and 9 illustrate one form of guide structure 280 that may be used in coaction with such as tube vibrator 140, for example, as attached into a land carrier such as a truck bed. Additional crane and tether structure 36 (FIG. 1) may also be used to support tube vibrator 140 from above, but the maintaining of exact vertical alignment of tube 144 may be carried out by the aligning structure 280. An aligning frame 282 is supported on a tube member 284 which is slidably retained within a tubular tongue member 286. Tongue member 286 is pivotally attached about vertical pivot pin 288 of pivot bracket 290 which is rigidly secured to the carrier frame member 292, a transverse rear frame member. A turnbuckle 294 adjusts the extension of tubular member 284, and left and right turnbuckle assemblies 296, 298 adjust the azimuth orientation of tongue member 286.

The alignment frame 282 may consist of such as square tube members formed into a square frame structure. As shown in FIG. 9, a first right angle tube section 300 is secured at the middle of one side to the extendable tube 284. Right angle section 300 terminates with connecting flanges 302 and 304. A mating right angle frame 306 terminates with flanges 308 and 310 for fastened engagement with flanges 302 and 304. Thus, assembled, each quadrature leg of alignment frame 282 carries a respective horizontally aligned roller 312, 314, 316 and 318 which bear against the tube 144 to maintain alignment and steadying.

The foregoing discloses a novel vibrator system that utilizes a tubular member for introduction of vibratory seismic energy into a point on the earth's surface. The vibrator is particularly useful for employ over soft earth areas and may be utilized from either a land vehicle or a marine vehicle as a seismic energy source. Shear wave vibrations are generated variously relative to the coupling tube engaged in the earth medium, and such device has the capability of imparting elliptically polarized shear waves into the earth medium at the introduction point. Various aligning and tethering structure is utilized to maintain proper generation attitude through a series of energy transmissions, and support vehicles of various land and marine types may be utilized.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. A vibratory source for imparting seismic shear wave energy into an earth medium, underlying a relatively softer earth surface medium, comprising:
   rigid, hollow tube means of elongate, tubular shape having an axis and first and second ends with said first end inserted through said surface medium into firm energy-coupling engagement with said earth medium;
   a housing means rigidly secured in axially balanced relationship on the second end of said tube means;
   shaft means rotatably supported in said housing means in axial alignment with said tube means adjacent the tube means second end;
   motor means rigidly secured to said housing means and providing rotational drive to said shaft means; and
   an eccentric weight rotor secured on said shaft means and generating an orbital force for transmission along the length of the tube means to the first end thereby to couple seismic wave energy of predetermined frequency and duration into said earth medium.

2. A vibratory source as set forth in claim 1 which further includes:
   tip means rigidly secured to said tube means first end to provide a pointed entry into said earth medium.

3. A vibratory source as set forth in claim 2 wherein said tip means comprises:
   a conical housing.

4. A vibratory source as set forth in claim 1 which further includes:
   collar means retained around the tube means first end and inflatable to engage the first end and the surrounding earth medium in energy-coupling relationship.

5. A vibratory source as set forth in claim 4 wherein said collar means comprises:
   an inflatable packer assembly.

6. A vibratory source as set forth in claim 1 which is further characterized to include:
   mobile means suspending said vibratory means and tube means vibrationally isolated but continually energy-coupled to said earth medium.

7. A vibratory source as set forth in claim 6 wherein: said mobile means is a land vehicle.

8. A vibratory source as set forth in claim 6 wherein: said mobile means is a water vehicle.

9. A vibratory source for imparting seismic shear wave energy into an earth medium, underlying a relatively softer earth surface medium, comprising:
   rigid, hollow tube means of elongate, tubular shape having an axis and first and second ends;
   a generally conical housing secured to the first end in axial alignment with said tube means, said housing being pointed for insertion through said surface medium into circumferal engagement with said earth medium;
   vibratory means generating an orbital force and being secured within said generally conical housing to impart lateral vibration to the tube means thereby to couple shear wave energy from the generally conical housing into said earth medium, said vibratory means consisting of a shaft rotatably supported in said generally conical housing in axial alignment and having an eccentric weight rotor secured thereon;
   means for imparting drive rotation to said shaft at pre-selected frequency and duration; and
   hold-down means rigidly secured to the tube means second end and exerting a pre-selected force in axial direction on the tube means second end.

10. A vibratory source as set forth in claim 9 wherein said means for imparting drive rotation comprises:
    a hydraulic motor mounted in said generally conical housing.

11. A vibratory source as set forth in claim 9 which is further characterized to include:
    mobile means suspending said vibratory means and tube means vibrationally isolated from the mobile means while in continually energy-coupled relationship to said earth medium.

* * * * *